UNITED STATES PATENT OFFICE.

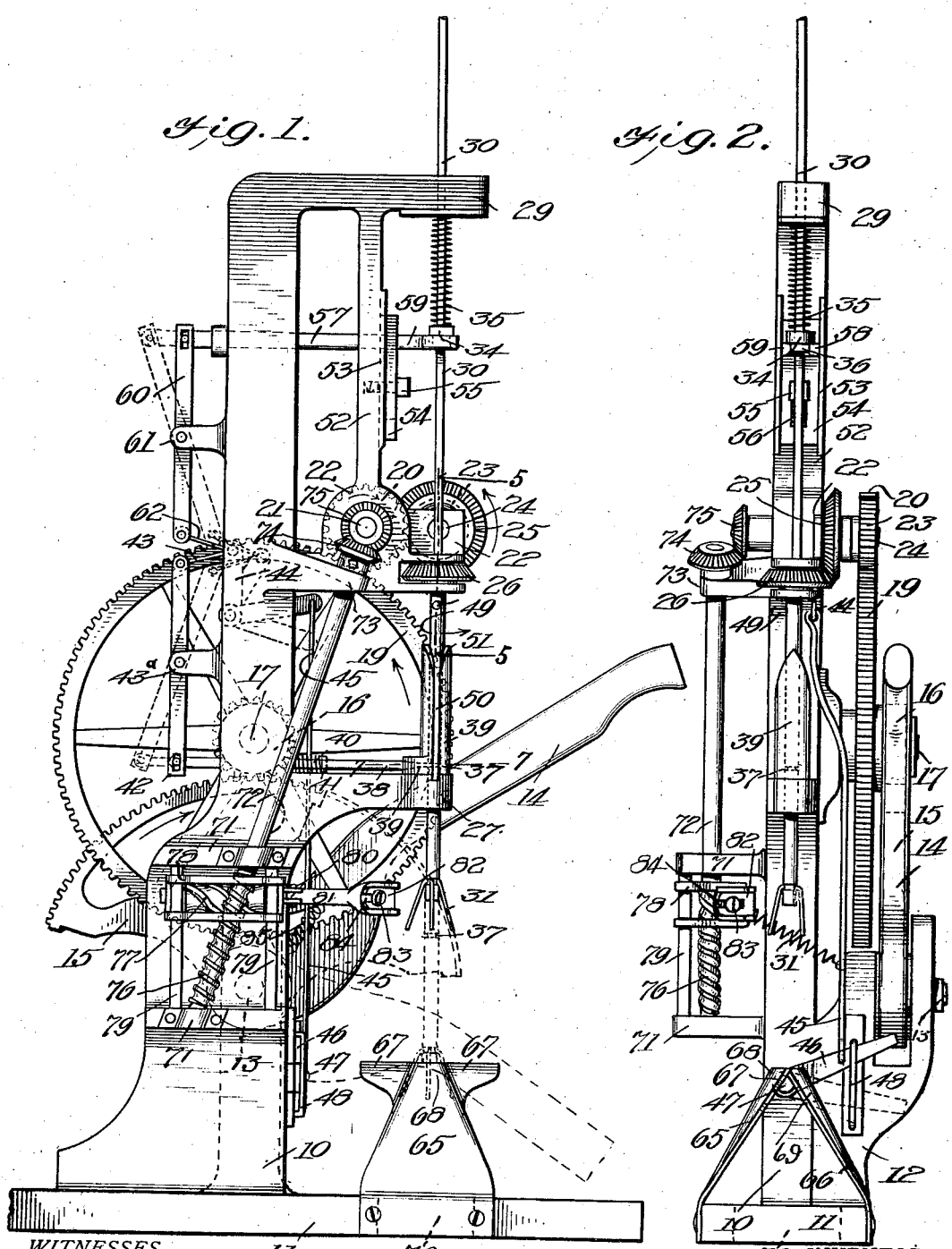

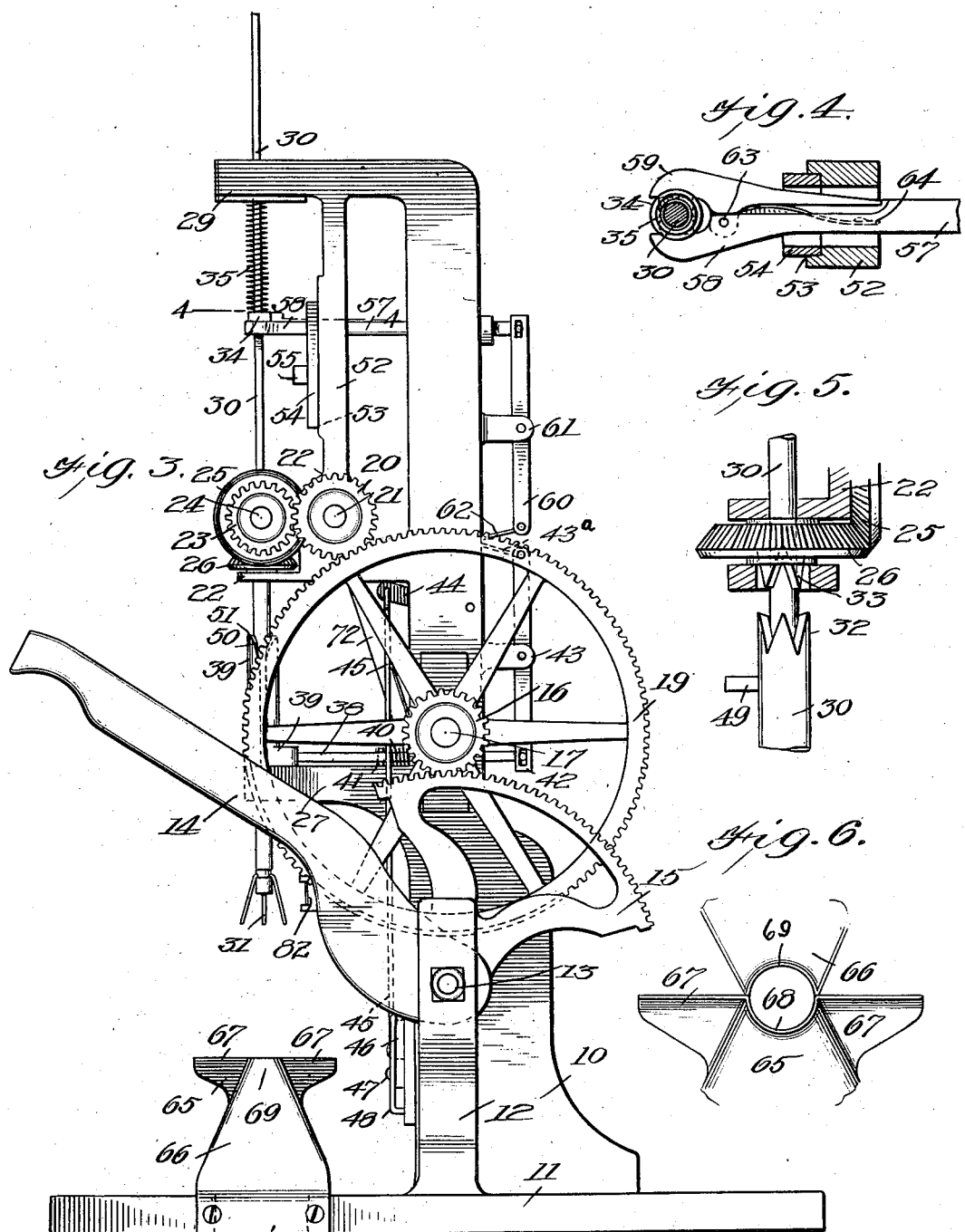

FRANCIS W. LANCASTER, OF FLIPPIN, ARKANSAS.

APPARATUS FOR PARING AND PITTING FRUIT.

1,062,406.　　　　　Specification of Letters Patent.　　Patented May 20, 1913.

Application filed January 23, 1912. Serial No. 672,824.

*To all whom it may concern:*

Be it known that I, FRANCIS W. LANCASTER, a citizen of the United States, residing at Flippin, in the county of Marion and State of Arkansas, have invented certain new and useful Improvements in Apparatus for Paring and Pitting Fruit, of which the following is a specification.

This invention relates to apparatus for paring and pitting peaches and other fruit, and its object is to provide an apparatus of this kind which is rapid and efficient in operation.

The invention also has for its object to provide in an apparatus of the kind stated, a novel construction and arrangement of parts to be hereinafter described and claimed.

In order that the invention may be better understood, reference is had to the accompanying drawing, in which—

Figure 1 is a side elevation of the apparatus. Fig. 2 is a front elevation thereof. Fig. 3 is a side elevation taken from the opposite side of that shown in Fig. 1. Fig. 4 is a horizontal section on the line 4—4 of Fig. 3. Fig. 5 is a vertical section on the line 5—5 of Fig. 1. Fig. 6 is a plan view of the pitting device. Fig. 7 is a horizontal section on the line 7—7 of Fig. 1.

Referring specifically to the drawing, the supporting frame of the apparatus comprises a standard 10 which rises from a suitable base 11. Near its bottom, the standard carries a bracket 12 to which is fulcrumed at 13 a vertically swinging hand-lever 14 carrying a sector gear 15 which is in mesh with a pinion 16 loose on a stub-shaft 17 carried by the standard 10. Fixed to the pinion 16 so as to turn therewith, is a large spur gear 19, which is in mesh with a pinion 20, the shaft 21 of which is supported in a bearing bracket 22 carried by and extending forwardly from the standard 10. The pinion 20 is fast on the shaft 21 and is in mesh with a pinion 23 fast on a shaft 24 supported in the bracket 22. On the shaft 24 is fast a bevel gear 25 which is in mesh with a bevel gear 26.

Below the bracket 22, a bracket 27 extends forwardly from the standard, and at the top of the standard is a forwardly extending bracket 29. In these three brackets are alined openings in which is slidably mounted a vertical stem 30, which is the shank of the fruit holder, the lower end of the stem carrying a fork 31 on which the fruit to be operated on is impaled and held. The lower portion of the stem is enlarged in diameter, and the top of said enlargement is formed into clutch head 32 which is adapted to engage a corresponding clutch head 33 on the bevel gear 26 whereby a driving connection between said gear and the stem is had and the latter is rotated.

Around the upper end of the stem 30, between the bracket 29 and an abutment 34 on the stem, is coiled a spring 35. The abutment is loose on the stem and below the abutment the stem carries an adjusting nut 36, which latter, upon being screwed up or down on the stem, holds the abutment in adjusted position, the adjustment of the abutment being for the purpose of varying the tension of the spring.

The stem 30, near its lower end, has a circumferential groove 37 in which is adapted to seat a spring latch 38, the latter being slidably mounted on top of the bracket 27 and passing into a tubular member 39 rising from said bracket. The bore of the tubular member is in line with the opening in the bracket through which the stem passes, and said stem passes through said bore. When the stem is elevated sufficiently to bring the groove 37 opposite the end of the latch 38, the latter slips into said groove and thus locks the stem in elevated position. The latch is actuated by a spring 40 coiled around the same between the standard 10 and a transverse pin 41 carried by the latch.

The latch 38 passes loosely through an opening in the standard and projects a short distance from the rear thereof, to which projecting end is connected one end of a lever 42 which is fulcrumed to a support 43ª carried by the standard. The other end of the lever is connected by a link 43 to one of the branches of a bell-crank lever 44 mounted within a slot in the standard. The other branch of the lever 44 is connected by a rod 45 to a lever 46 which is fulcrumed at one of its ends, as indicated at 47, to the front of the standard and has its free end extending into the path of the hand lever 14, so as to be engaged thereby when the latter is at the end of its downward swing. The free end of the lever 46 works under a guide 48 carried by the bracket 12.

The enlarged lower end of the stem 30 carries a transverse pin 49 which is adapted to enter diametrically opposite vertical slots 50 in the member 39, said slots extending downwardly from the top of the member and having their upper ends flared, as indicated at 51, to facilitate the entry of the pin 49.

From the bracket 22 rises a post 52, having on one side a guide groove 53 in which is adjustably mounted a block 54, the block being secured in adjusted position by a screw 55 passing through a slot 56 therein and into the post. The adjustment is vertical.

In the post 52 and the block 54 are alined transverse apertures in which is mounted a horizontally slidable holder for the spring 35, said holder comprising a stem 57 which passes through the apertures and also through an aperture in the standard 10, and has at one of its ends a fixed jaw 58 coöperating with an opposite movable jaw 59. The other end of the stem is connected to one end of a lever 60 fulcrumed to a support 61 carried by the standard. The other end of the lever is connected by a link 62 to the same branch of the bell-crank lever 44 to which the lever 42 is connected.

The jaw 59 is pivoted to the jaw 58 as indicated at 63. Between the jaws is located a spring 64 for closing the jaw 59, and the outer edge of said jaw is beveled so that when the stem 57 is retracted and the beveled surface engages the outer end of the aperture in the block 54, said jaw will be forced open. The jaw 59 swings in a horizontal plane to open and closed position.

On the base 11 is mounted a device for splitting the fruit and removing the seed. This device comprises two plates 65 and 66, respectively, rising from the sides of the base and converging toward their upper ends. The plate 65 has two opposite laterally extending wings 67, the upper edges of which are sharp to form cutting blades. Between these two wings the plate is bent outwardly into substantially semi-circular form as indicated at 68. The plate 66 is tapered toward its upper end, and said end is also bent outwardly into substantially semi-circular form as indicated at 69. The bends 68 and 69 are opposite each other and their ends are joined so that a circular opening is had between the wings 67, and in line with this opening the base 11 has an opening 70.

On one side of the standards 10 are vertically spaced bearing brackets 71 which support the lower end of an inclined shaft 72, the upper end of the shaft being supported in a bearing 73 carried by the standard, and said upper end of the shaft carrying a bevel gear 74 which is in mesh with a bevel gear 75 fast on the shaft 21, whereby the motion of said shaft 21 is transmitted to the shaft 72.

Between the brackets 71, the shaft 72 is formed with a screw 76 which is in mesh with a worm 77, which latter is carried by a cross-head 78 slidably mounted on vertical guide rods 79 extending between the brackets 71. To the worm 77 is hinged, as indicated at 80, the shank 81 of a paring knife blade 82, said blade being adjustably mounted on the outer end of the shank, said end being enlarged and formed with a flat face extending at an acute angle to the longitudinal axis of the shank, and on which surface the blade is mounted. A screw 83 passing through a slot 84 in the blade and into the enlarged end of the shank, adjustably fastens the blade to the shank. A coiled spring 85 connected at one end to the shank 81 and at its other end to the bracket 12, serves to yieldingly hold the blade against the fruit which is being operated on.

In operation, the stem 30 is pushed upwardly until the latch 38 enters the groove 37, this upward movement of the stem compressing the spring 35 and also coupling the stem to the bevel gear 26. The pin 49 is also positioned above the member 39 by the upward movement of the stem. The holder for the spring 35 is adjusted so that the jaws 58 and 59 close in on the stem below the abutment 34. It will be noted that the nut is smaller than the abutment 34 so that the jaws may engage the bottom of the abutment. The peach or other fruit is now stuck on the fork 31, and the hand lever 14 is swung downward, whereupon, through the gearing herein described, the stem 30 is rotated and the worm 77 is caused to travel upwardly. The fruit held by the fork is therefore rotated, and the blade 82 pares the same, said blade being yieldingly held against the fruit by the spring 85, and said blade also being carried upwardly by the worm, so that every part of the fruit is pared. At the end of the downward swing of the hand lever, the paring operation being now completed, said hand lever strikes the lever 46 and through the connections herein described, retracts the latch 38 and also opens and retracts the jaws 58 and 59, whereupon the stem 30 and the spring 35 are released, and the stem is forced downwardly by the expansion of the spring so as to force the fruit over the cutting blades 67, whereby the fruit is split in half and the stone is removed by being forced through the opening formed by the bends 68 and 69, and it drops through the opening 70, below which latter may be placed a suitable receptacle to receive the stones. The hand lever is now swung upwardly, whereupon the worm is caused to travel downwardly to position the paring knife for the next operation. The stem is then also pushed upwardly by hand and locked, and another fruit is placed on the fork, whereupon the apparatus is ready for the next operation.

In order that the seed may be pushed entirely through the opening formed by the bends 68 and 69, the fork 31 straddles the pitting device when the stem 30 is at the limit of its downward movement, the pin 49 working in the slots 50 keeping the stem in proper position so that the fork will not strike the pitting device and thus be prevented from straddling the same.

I claim:

1. In an apparatus for paring and pitting fruit, a rotatable and longitudinally movable holder for the fruit, a pitting device means for rotating the holder for the paring operation, a latch for locking the holder against longitudinal movement, a releasing device for the latch in the path of the holder rotating means, and means for advancing the holder when the latch is released therefrom to engage the fruit with the pitting device.

2. In an apparatus for paring and pitting fruit, a rotatable and longitudinally movable holder for the fruit, a pitting device, means for rotating the holder for the paring operation, a latch for locking the holder against longitudinal movement, a spring coiled around the holder for moving the same longitudinally to engage the fruit with the pitting device, an abutment for one end of the spring, a holding device for the abutment, and releasing means for the latch and the holding device.

3. In an apparatus for paring and pitting fruit, a rotatable and longitudinally movable holder for the fruit, a pitting device, means for rotating the holder for the paring operation, a latch for locking the holder against longitudinal movement, a spring coiled around the holder for moving the same longitudinally to engage the fruit with the pitting device, an abutment for one end of the spring, a holding device for the abutment, said holding device comprising a longitudinally movable stem carrying jaws, one of which jaws is movable, and said jaws closing around the holder beneath the abutment and the movable jaw opening when the stem is retracted and closing when the stem is advanced, and means for releasing the latch and for retracting the aforesaid stem.

4. In an apparatus for paring and pitting fruit, a rotatable and longitudinally movable fruit holder, a pitting device toward and from which the fruit holder is movable, means for rotating the fruit holder for the paring operation, means for coupling the fruit holder to said means, said holder uncoupling when it moves toward the pitting device, a latch for holding the fruit holder against movement toward the pitting device, means for releasing the latch, and means for advancing the fruit holder toward the pitting device when the latch is released.

5. In an apparatus for paring and pitting fruit, a rotatable and longitudinally movable stem, a fork carried by the stem, a pitting device toward and from which the fork is movable, said fork being adapted to straddle the pitting device, means for rotating the stem for the paring operation, a latch for holding the stem retracted during the paring operation, means for releasing the latch, means for guiding the stem to center the fork with respect to the pitting device, and means for advancing the stem to carry the fork toward the pitting device.

6. In an apparatus for paring and pitting fruit, a rotatable and longitudinally movable stem, a fork carried by the stem, a pitting device toward and from which the fork is movable, said fork being adapted to straddle the pitting device, means for rotating the stem for the paring operation, a latch for holding the stem retracted during the paring operation, means for releasing the latch, a tubular guide member for the stem, said member having side slots, a cross pin on the stem working in the slots, and means for advancing the stem to carry the fork toward the pitting device.

7. In an apparatus for paring and pitting fruit, a rotatable and longitudinally movable holder for the fruit, a pitting device, means for rotating the holder for the paring operation, a latch for locking the holder against longitudinal movement, a bell-crank lever, a lever connected to one branch of the bell-crank lever, and located in the path of the holder rotating means, a second lever connected at one of its ends to the other branch of the bell-crank lever and at its other end to the latch, and means for advancing the holder when the latch is released therefrom to engage the fruit with the pitting device.

In testimony whereof I affix my signature in presence of two witnesses.

FRANCIS W. LANCASTER.

Witnesses:
  E. A. BARNETT,
  J. S. OWENS.